(12) United States Patent
Abe

(10) Patent No.: US 10,910,664 B2
(45) Date of Patent: Feb. 2, 2021

(54) APPARATUS FOR MANUFACTURING STACK OF SHEET-SHAPED ELECTRODES

(71) Applicant: TOYOTA JIDOSHA KABUSHIKI KAISHA, Toyota (JP)

(72) Inventor: Nobuhira Abe, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/592,914

(22) Filed: Oct. 4, 2019

(65) Prior Publication Data
US 2020/0153026 A1    May 14, 2020

(30) Foreign Application Priority Data
Nov. 13, 2018    (JP) ................. 2018-213003

(51) Int. Cl.
| | |
|---|---|
| *B23K 20/00* | (2006.01) |
| *H01M 10/04* | (2006.01) |
| *H01M 10/0585* | (2010.01) |
| *B23K 20/26* | (2006.01) |
| *B23K 20/04* | (2006.01) |
| *B23K 20/10* | (2006.01) |
| *B23K 101/36* | (2006.01) |

(52) U.S. Cl.
CPC ......... *H01M 10/0404* (2013.01); *B23K 20/04* (2013.01); *B23K 20/103* (2013.01); *B23K 20/26* (2013.01); *H01M 10/0585* (2013.01); *B23K 2101/36* (2018.08)

(58) Field of Classification Search
CPC ......... H01M 10/0404; H01M 10/0585; H01M 10/058; H01M 10/04; B23K 20/26; B23K 20/00–04; B23K 2101/36–42; B23K 20/103; B23K 11/3036; B23K 11/3045; B23K 11/06–068; Y02E 60/10; B65G 57/03
USPC ... 228/44.3–45, 47.1–49.5, 58, 235.2–235.3, 228/43, 102–103, 105, 8–12
See application file for complete search history.

(56) References Cited

U.S. PATENT DOCUMENTS

| | | | | |
|---|---|---|---|---|
| 10,326,125 | B2* | 6/2019 | Ikeda | ........................ B05C 1/12 |
| 10,573,865 | B2* | 2/2020 | Yuhara | .............. H01M 10/0585 |
| 2002/0035903 | A1* | 3/2002 | Sato | ........................ H01G 9/155 |
| | | | | 83/13 |
| 2014/0026399 | A1* | 1/2014 | Yuhara | .............. H01M 10/0413 |
| | | | | 29/623.1 |

(Continued)

FOREIGN PATENT DOCUMENTS

| | | |
|---|---|---|
| JP | 2010-212165 A | 9/2010 |
| JP | 2016-157586 A | 9/2016 |

(Continued)

*Primary Examiner* — Kiley S Stoner
(74) *Attorney, Agent, or Firm* — Sughrue Mion, PLLC

(57) ABSTRACT

A metal foil bonding device (50) for bonding pieces of metal foil (2) on the successively conveyed sheet-shaped electrodes (1) on the conveyor plates (20) is provided. When it is detected that there is an abnormality in a piece of metal foil (2) to be bonded to the sheet-shaped electrode (1) on the conveyor plate (20) next conveyed to the metal foil bonding device (50), the conveyor plate (20) next conveyed to the metal foil bonding device (50) is temporarily stopped right before the metal foil bonding device (50).

7 Claims, 12 Drawing Sheets

(56) References Cited

U.S. PATENT DOCUMENTS

| | | | |
|---|---|---|---|
| 2014/0272543 A1* | 9/2014 | Devan | H01M 10/049 |
| | | | 429/162 |
| 2016/0126596 A1* | 5/2016 | Heishi | H01M 2/021 |
| | | | 429/162 |
| 2017/0120380 A1* | 5/2017 | Zhang | H01M 10/0525 |
| 2017/0263909 A1* | 9/2017 | Shimizu | H01G 11/12 |
| 2017/0263970 A1* | 9/2017 | Ogawa | B65B 51/22 |
| 2019/0058222 A1* | 2/2019 | Kang | H01M 10/0583 |
| 2019/0252739 A1* | 8/2019 | Mizuno | H01R 9/22 |
| 2020/0136190 A1* | 4/2020 | Yamashita | H01M 10/0585 |
| 2020/0144589 A1* | 5/2020 | Abe | H01M 4/04 |
| 2020/0144657 A1* | 5/2020 | Kifune | H01M 4/04 |
| 2020/0223202 A1* | 7/2020 | Shintani | H01M 4/0435 |

FOREIGN PATENT DOCUMENTS

| | | | | |
|---|---|---|---|---|
| WO | WO-2014080544 A1 * | 5/2014 | | B29C 65/02 |
| WO | WO-2018199484 A1 * | 11/2018 | | H01M 2/16 |

\* cited by examiner

APPARATUS FOR MANUFACTURING STACK OF SHEET-SHAPED ELECTRODES

FIELD

The present invention relates to an apparatus for manufacturing a stack of sheet-shaped electrodes.

BACKGROUND

Known in the art is a battery module manufacturing apparatus designed to wrap a positive electrode, negative electrode, electrolyte, and other components of a battery by a laminate film to form a thin-walled box-shaped laminate battery, attach such a laminate battery to a jig for holding the ends of the peripheral edges of the laminate battery, stack such laminate batteries attached to jigs in states attached to the jigs, constrain the stacked laminate batteries in the stacking direction, detach all of the jigs from the laminate batteries after constraining them, and thereby manufacture a battery module comprised of a stack of laminate batteries (for example, see Japanese Unexamined Patent Publication No. 2016-157586).

SUMMARY

Technical Problem

However, in this battery module manufacturing apparatus, there is the problem that the positive electrodes, negative electrodes, electrolytes, and other components of the batteries are not judged for abnormalities before the laminate batteries are manufactured, so if learning that there are abnormalities in the positive electrodes, negative electrodes, electrolytes, and other components of the batteries after the battery modules are completed, the battery modules end up being wasted.

Solution to Problem

To keep such a problem from occurring, according to the present invention, there is provided an apparatus for manufacturing a stack of sheet-shaped electrodes comprising;

a sheet-shaped electrode conveyance device which has a rail extending along a conveyance route, a plurality of movers of linear motors moving on the rail, and conveyor plates attached to the movers to convey sheet-shaped electrodes to a stacking station, each conveyor plate carrying a sheet-shaped electrode, an operation control device for control of movement of the movers and a metal foil bonding device arranged in the conveyance route for bonding pieces of metal foil on successively conveyed sheet-shaped electrodes on the conveyor plates, wherein the operation control device controls the movers to make the conveyor plate next conveyed to the metal foil bonding device stop temporarily right before the metal foil bonding device when it is detected that there is an abnormality in a piece of metal foil to be bonded to the sheet-shaped electrode on the conveyor plate next conveyed to the metal foil bonding device, and the operation control device controls the movers to make the conveyor plate which is temporarily stopped move to the metal foil bonding device when it is detected that there is no abnormality in a piece of metal foil to be bonded to the sheet-shaped electrode on the conveyor plate temporarily stopped right before the metal foil bonding device.

Advantageous Effects of Invention

When it is detected that there is an abnormality in a piece of metal foil to be attached to a sheet-shaped electrode on a conveyor plate next conveyed to a metal foil bonding device, the abnormal piece of metal foil is prevented from being bonded to the sheet-shaped electrode and thereby an abnormal sheet-shaped electrode is prevented from being prepared.

DESCRIPTION OF EMBODIMENTS

Figure 2A:
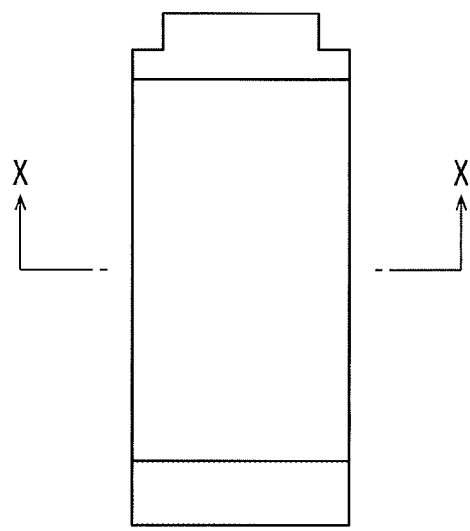
FIGS. 2A, 2B, 2C, and 2D are views for explaining a unit fuel cell and sheet-shaped electrode.
Figure 2B:
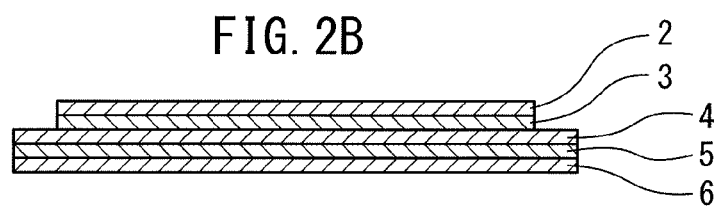

The present invention relates to an apparatus for manufacturing a stack of sheet-shaped electrodes. From this stack of sheet-shaped electrodes, for example, a battery to be mounted in a vehicle is formed. Therefore, first, the sheet-shaped electrodes forming this stack will be explained. FIG. 2A and FIG. 2B respectively show a plan view of the components of the battery manufactured using this sheet-shaped electrode, that is, a unit cell, and a cross-sectional view of the unit cell seen along the line X-X of FIG. 2A. Note that, the thickness of the unit cell is 1 mm or less. Therefore, in FIG. 2B, the thicknesses of the layers are shown considerably exaggerated.

Referring to FIG. 2B, 2 indicates a positive electrode current collector layer, 3 indicates a positive electrode active material layer, 4 indicates a solid electrolyte layer, 5 indicates a negative electrode active material layer, and 6 indicates a negative electrode current collector layer. The positive electrode current collector layer 2 is formed from a conductive material. In this embodiment according to the present invention, this positive electrode current collector layer 2 is formed from metal foil for current collection use, for example, aluminum foil. Further, the positive electrode active material layer 3 is formed from a positive electrode active material able to store lithium ions, sodium ions, calcium ions, and other metal ions at the time of discharge and to release them at the time of charging. Further, the solid electrolyte layer 4 is formed from a material having conductivity with respect to lithium ions, sodium ions, calcium ions, and other metal ions and able to be utilized as a material for an all solid state battery.

On the other hand, the negative electrode active material layer 5 is formed from a negative electrode active material able to release lithium ions, sodium ions, calcium ions, and other metal ions at the time of discharge and to store them at the time of charging. Further, the negative electrode current collector layer 6 is formed from a conductive material. In this embodiment according to the present invention, this negative electrode current collector layer 2 is formed from metal foil for current collection use, for example, copper foil. Further, as will be understood from the above-mentioned explanation, the batteries manufactured in this embodiment of the present invention are all solid state batteries. In this case, the batteries are preferably all solid lithium ion secondary batteries.

Figure 2C:
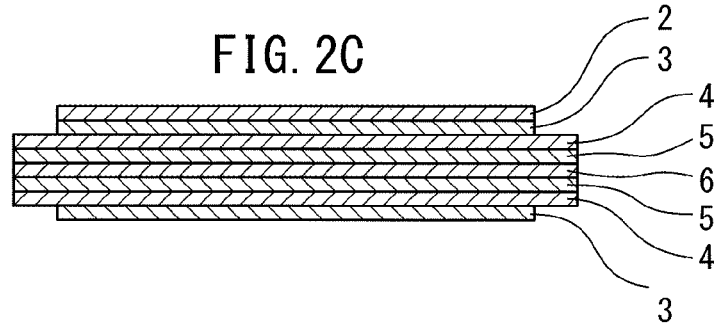
Figure 2D:
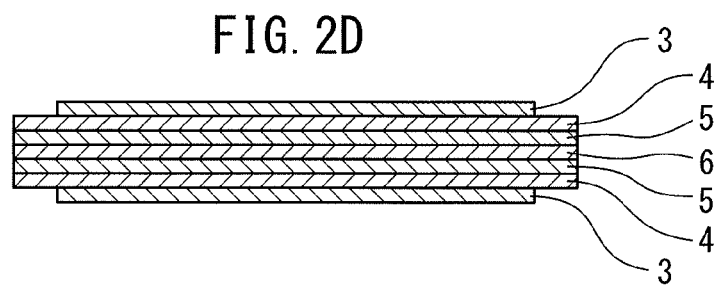

Now then, a sheet-shaped electrode used in the embodiment according to the present invention has a rectangular plan shape similar to FIG. 2A and has a cross-sectional structure shown in FIG. 2C or FIG. 2D. Note that, these FIG. 2C and FIG. 2D show cross-sectional views at positions similar to the X-X line of FIG. 2A. Note that, in these FIG. 2C and FIG. 2D as well, in the same way as FIG. 2B, 2 indicates a positive electrode current collector layer, 3 indicates a positive electrode active material layer, 4 indicates a solid electrolyte layer, 5 indicates a negative electrode active material layer, and 6 indicates a negative electrode current collector layer. The sheet-shaped electrode shown in FIG. 2C has a negative electrode current collector layer 6 positioned at its center part. In the upward direction from this negative electrode current collector layer 6, a negative electrode active material layer 5, solid electrolyte layer 4, positive electrode active material layer 3, and positive electrode current collector layer 2 are successively formed. In the downward direction from the negative electrode current collector layer 6, a negative electrode active material layer 5, solid electrolyte layer 4, and positive electrode active material layer 3 are successively formed. In this case, in the embodiment according to the present invention, the negative electrode current collector layers 6 are formed from copper foil, while the positive electrode current collector layers 2 are formed from aluminum foil.

On the other hand, the sheet-shaped electrode shown in FIG. 2D has a negative electrode current collector layer 6 positioned at its center part. In each of the upward direction and downward direction from this negative electrode current collector layer 6, a negative electrode active material layer 5, solid electrolyte layer 4, and positive electrode active material layer 3 are successively formed. That is, the sheet-shaped electrode shown in FIG. 2D does not have the positive electrode current collector layer 2. In the case shown in FIG. 2D as well, the negative electrode current collector layer 6 is formed from copper foil. In the embodiment according to the present invention, the sheet-shaped electrode of the cross-sectional shape shown in FIG. 2D is formed in advance. As explained later, in the middle of the stacking process, aluminum foil (positive electrode current collector) is bonded to the sheet-shaped electrode of the cross-sectional shape shown in FIG. 2D. As a result, the sheet-shaped electrode of the cross-sectional shape shown in FIG. 2C, that is, the sheet-shaped electrode with aluminum foil 2 bonded to it, is formed.

In the embodiment according to the present invention, the sheet-shaped electrode to which this aluminum foil 2 is bonded is called the "sheet-shaped electrode 1". Note that, in the explanation of the embodiments according to the present invention, if not considered particularly confusing, the sheet-shaped electrode of the cross-sectional shape shown in FIG. 2D to which no aluminum foil 2 is bonded will also be called a "sheet-shaped electrode 1". As opposed to this, if it is desirable to express differentiated the sheet-shaped electrode 1 to which aluminum foil 2 is bonded and the sheet-shaped electrode 1 to which aluminum foil 2 is not bonded, the sheet-shaped electrode to which aluminum foil 2 is bonded will be called a "sheet-shaped electrode 1 with a positive electrode", while the sheet-shaped electrode to which aluminum foil 2 is not bonded will be referred to as a "sheet-shaped electrode 1 without a positive electrode".

Note that, the sheet-shaped electrodes 1 shown in FIG. 2C and FIG. 2D show single illustrations. Use of various structures of sheet-shaped electrodes 1 may be considered. For example, on one surface of the copper foil 6, it is possible to form a negative electrode active material layer 5, solid electrolyte layer 4, positive electrode active material layer 3, and positive electrode current collector layer 2, to form a negative electrode active material layer 5, solid electrolyte layer 4, and positive electrode active material layer 3, to form a negative electrode active material layer 5 and solid electrolyte layer 4, or to form only a negative electrode active material layer 5, while on the other surface of the copper foil 6, it is possible to form a negative electrode active material layer 5 and solid electrolyte layer 4 or form only a negative electrode active material layer 5 or to not form anything. Further, instead of the copper foil 6, it is possible to use the aluminum foil for forming the positive electrode current collector layer 2 and form on one surface of this aluminum foil 2 a positive electrode active material layer 3, solid electrolyte layer 4, negative electrode active material layer 5, and negative electrode current collector layer 6, to form a positive electrode active material layer 3, solid electrolyte layer 4, and negative electrode active material layer 5, to form a positive electrode active material layer 3 and solid electrolyte layer 4, or to form only a positive electrode active material layer 3 and possible to form on the other surface a positive electrode active material layer 3, solid electrolyte layer 4, and negative electrode active material layer 5, to form a positive electrode active material layer 3 and solid electrolyte layer 4, to form only a positive electrode active material layer 3, or to not form anything at all in the structure.

Therefore, if expressing this comprehensively, in the present invention, the sheet-shaped electrode 1 includes metal foil 2 or 6 for current collection use and at least one of a positive electrode active material layer 3 and negative electrode active material layer 5 formed on the metal foil 2 or 6 for current collection use. Note that, below, embodiments of the present invention will be explained taking as an example the case of the sheet-shaped electrode 1 having a structure shown in any of FIG. 2C and FIG. 2D.

Figure 1:
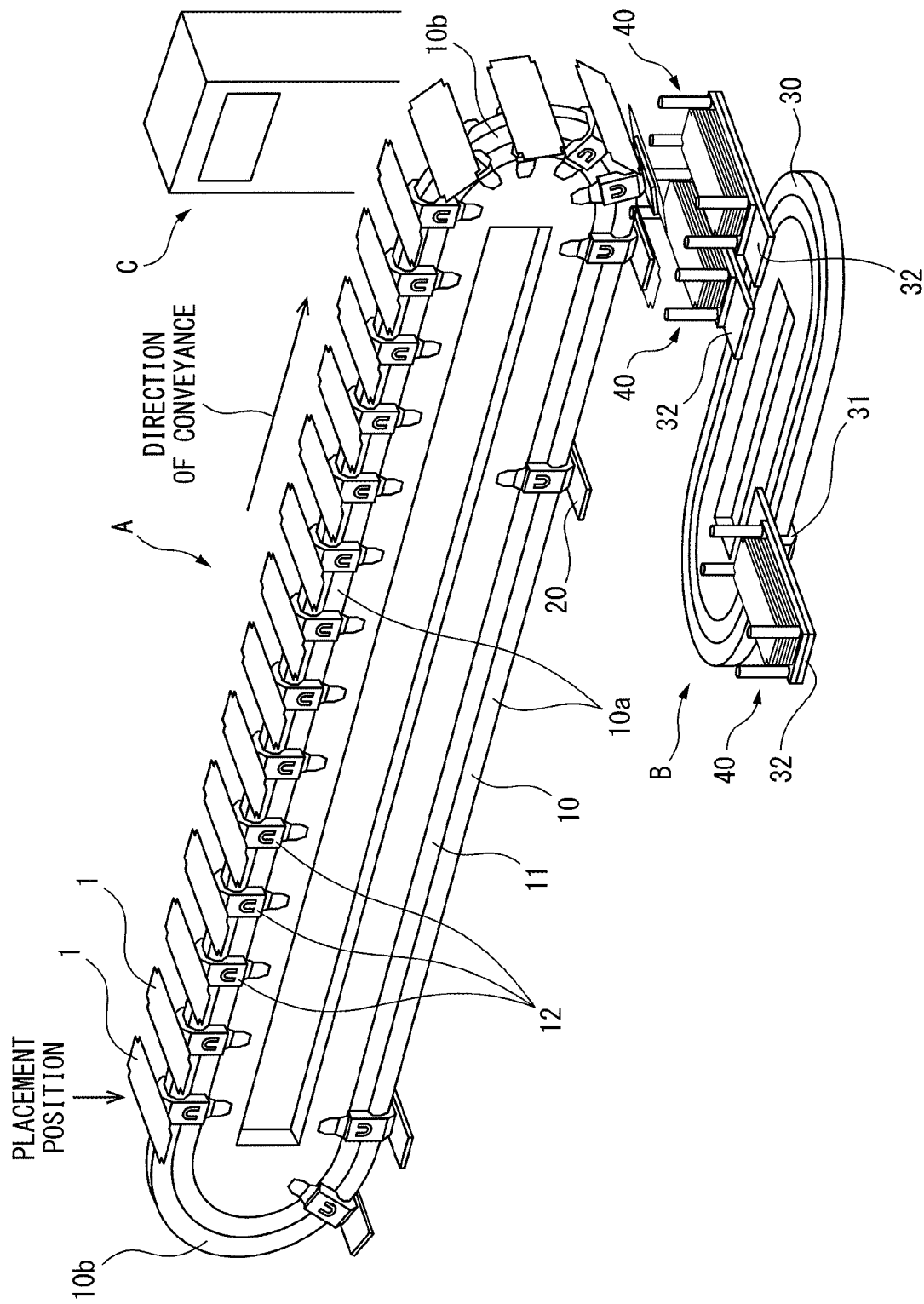
FIG. 1 is an overall view of a sheet-shaped electrode conveyance device and jig conveyance device.

Referring to FIG. 1, FIG. 1 shows a sheet-shaped electrode conveyance device A and jig conveyance device B. The sheet-shaped electrode conveyance device A is supplied with a sheet-shaped electrode 1 without a positive electrode with a cross-sectional shape shown in FIG. 2D at a placement position shown by the arrow in FIG. 1. This sheet-shaped electrode 1 is conveyed by the sheet-shaped electrode conveyance device A in the direction of conveyance shown by the arrow for forming a stack including the sheet-shaped electrode 1.

Figure 3:
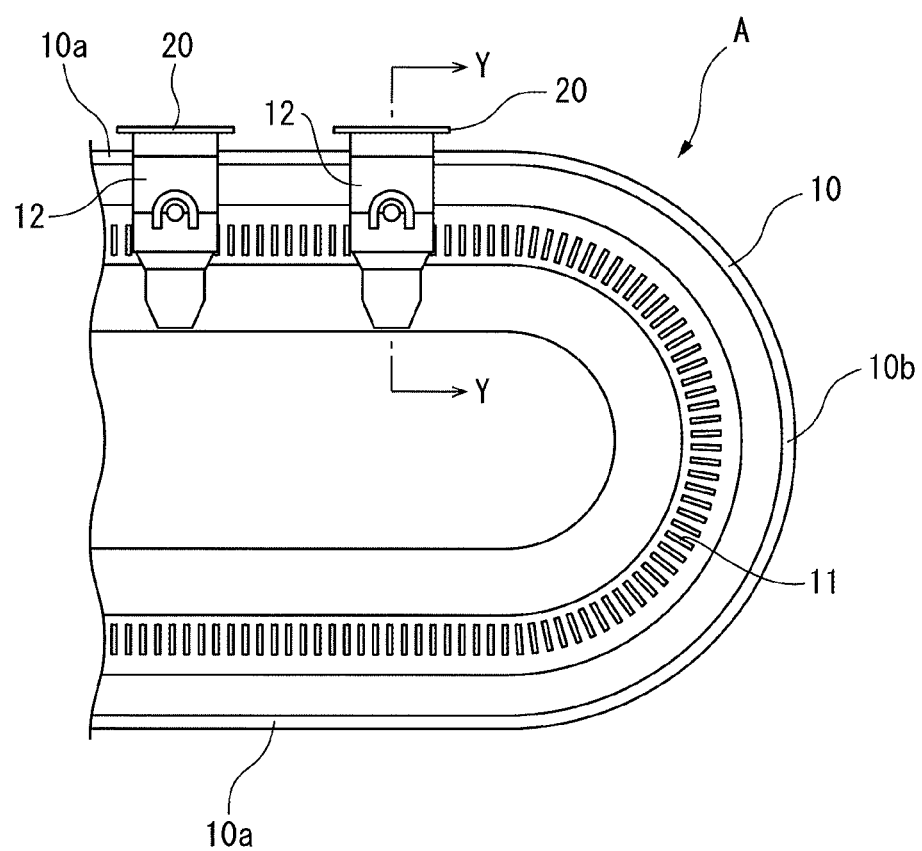
FIG. 3 is an enlarged side view of part of a sheet-shaped electrode conveyance device shown in FIG. 1.
Figure 4:
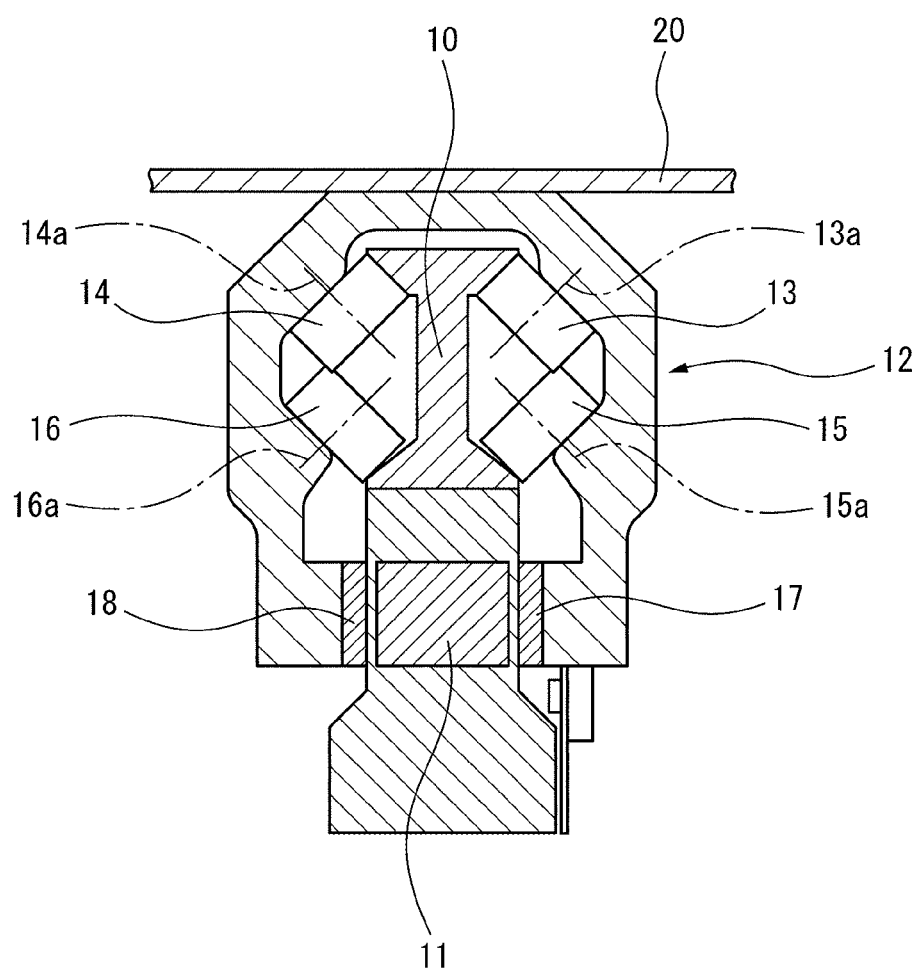
FIG. 4 is a cross-sectional view of a mover.

Next, this sheet-shaped electrode conveyance device A will be explained. FIG. 3 shows an enlarged side view of part of the sheet-shaped electrode conveyance device A shown in FIG. 1. Referring to FIG. 1 and FIG. 3, the sheet-shaped electrode conveyance device A is provided with an elliptical shaped rail 10 comprised of horizontal straight parts 10a spaced apart from each other in the vertical direction in the vertical plane and a pair of semicircular parts 10b and a plurality of movers 12 able to move on this rail 10. FIG. 4 shows a cross-sectional view of a mover 12 seen along the Y-Y line of FIG. 3. As shown in FIG. 4, this mover 12 is provided with a pair of guide rollers 13 attached to the mover 12 to be able to rotate about axes 13a and roll on the rail 10 (arranged at the front and rear in the direction of advance), a pair of guide rollers 14 attached to the mover 12 to be able to rotate about axes 14a and roll on the rail 10 (arranged at the front and rear in the direction of advance), a guide roller 15 attached to the mover 12 to be able to rotate about an axis 15a and roll on the rail 10, and a guide roller 16 attached to the mover 12 to be able to rotate about an axis 16a and roll on the rail 10.

On the other hand, this mover 12 is provided with a pair of permanent magnets 17, 18. Inside of the conveyance device A sandwiched between these permanent magnets 17, 18, a stator 11 around which a coil is wound is arranged. This stator 11 and permanent magnets 17, 18, that is, the stator 11 and mover 12, form a linear motor. Therefore, in the sheet-shaped electrode conveyance device A, the mover 12 of the linear motor is made to move on the rail 10. The speed of movement of this mover 12 etc. are controlled by an operation control device C shown in FIG. 1. Each mover 12 of the sheet-shaped electrode conveyance device A is, for example, numbered. Each mover 12 is controlled by the operation control device C independently for each mover 12.

Figure 5:
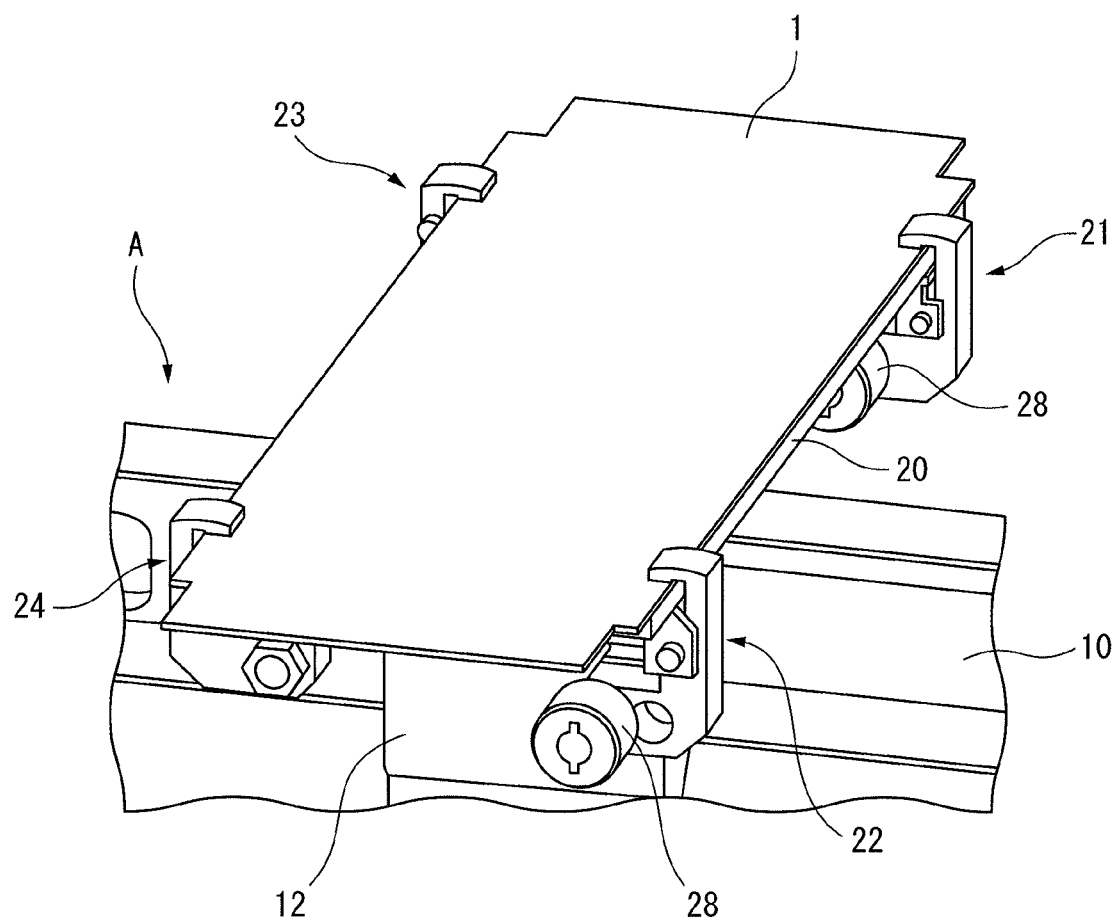
FIG. 5 is a perspective view of a conveyor plate.

As shown in FIG. 3 and FIG. 4, on the mover 12, a rectangular shaped conveyor plate 20 is attached. On this conveyor plate 20, a sheet-shaped electrode 1 is placed. FIG. 5 shows a perspective view of the conveyor plate 20 attached to the mover 12. Referring to FIG. 5, in the embodiment according to the present invention, the conveyor plate 20 has a plurality of clamps 21, 22, 23, 24 attached for clamping the sheet-shaped electrode 1 carried on the conveyor plate 20 against the conveyor plate 20 and holding the sheet-shaped electrode 1 at the placement position on the conveyor plate 20 during conveyance. In the embodiment shown in FIG. 5, a pair of the clamps 21, 22 are attached spaced apart from each other at the front end part of the conveyor plate 20 positioned at the front in the direction of advance while a pair of the clamps 23, 24 are attached spaced apart from each other at the rear end part of the conveyor plate 20 positioned at the rear in the direction of advance.

Figure 6A:
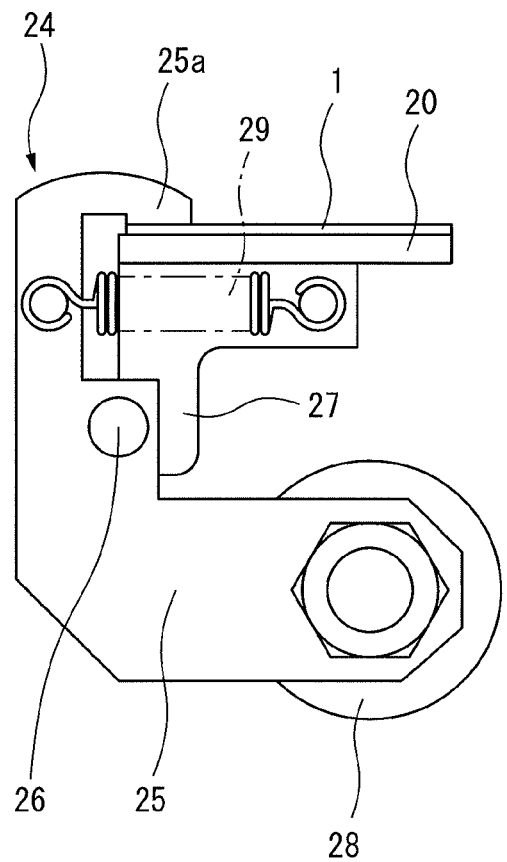
FIGS. 6A and 6B are views for explaining the operation of a clamp of the conveyor plate.
Figure 6B:
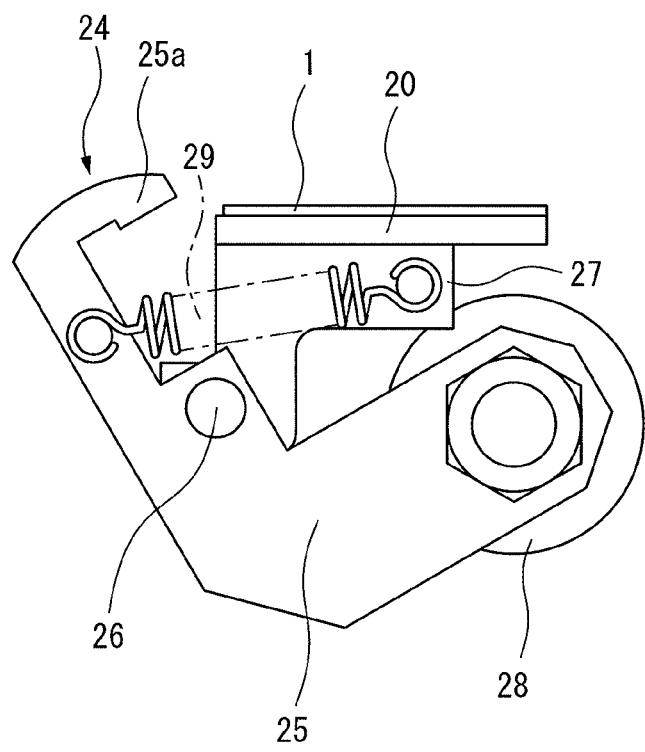

These clamps 21, 22, 23, 24 have the same structure. Therefore, the clamp 24 will be used as an example to explain the structure of the clamps. FIG. 6A shows the time when the sheet-shaped electrode 1 is clamped against the conveyor plate 20 by the clamp 24, while FIG. 6B shows the time when the clamp 24 releases the sheet-shaped electrode 1. Referring to FIG. 6A and FIG. 6B, the clamp 24 is provided with a clamp arm 25 forming a roughly speaking L-shape. The center part of this clamp arm 25 is attached by a support pin 26 to a support plate 27 fastened to the conveyor plate 20 to be able to rotate. One end of the clamp arm 25 is formed with a clamping part 25a extending to over the surface of the conveyor plate 20, while the other end of the clamp arm 25 has a roller 28 attached to it. The clamp arm 25 is constantly biased clockwise by a tension spring 29 attached between the clamp arm 25 and the support plate 27.

On the moving route of the mover 12, a stationary cam (not shown) able to engage with the roller 28 of the clamp arm 25 is provided. The roller 28 of the clamp arm 25 normally does not engage with this stationary cam. At this time, as shown in FIG. 6A, the sheet-shaped electrode 1 is clamped against the conveyor plate 20 by the clamping part 25a of the clamp arm 25 due to the spring force of the tension spring 29. On the other hand, if the roller 28 of the clamp arm 25 engages with the stationary cam, as shown in FIG. 6B, the roller 28 will rise and the sheet-shaped electrode 1 will be released from the clamping part 25a of the clamp arm 25.

Figure 7:
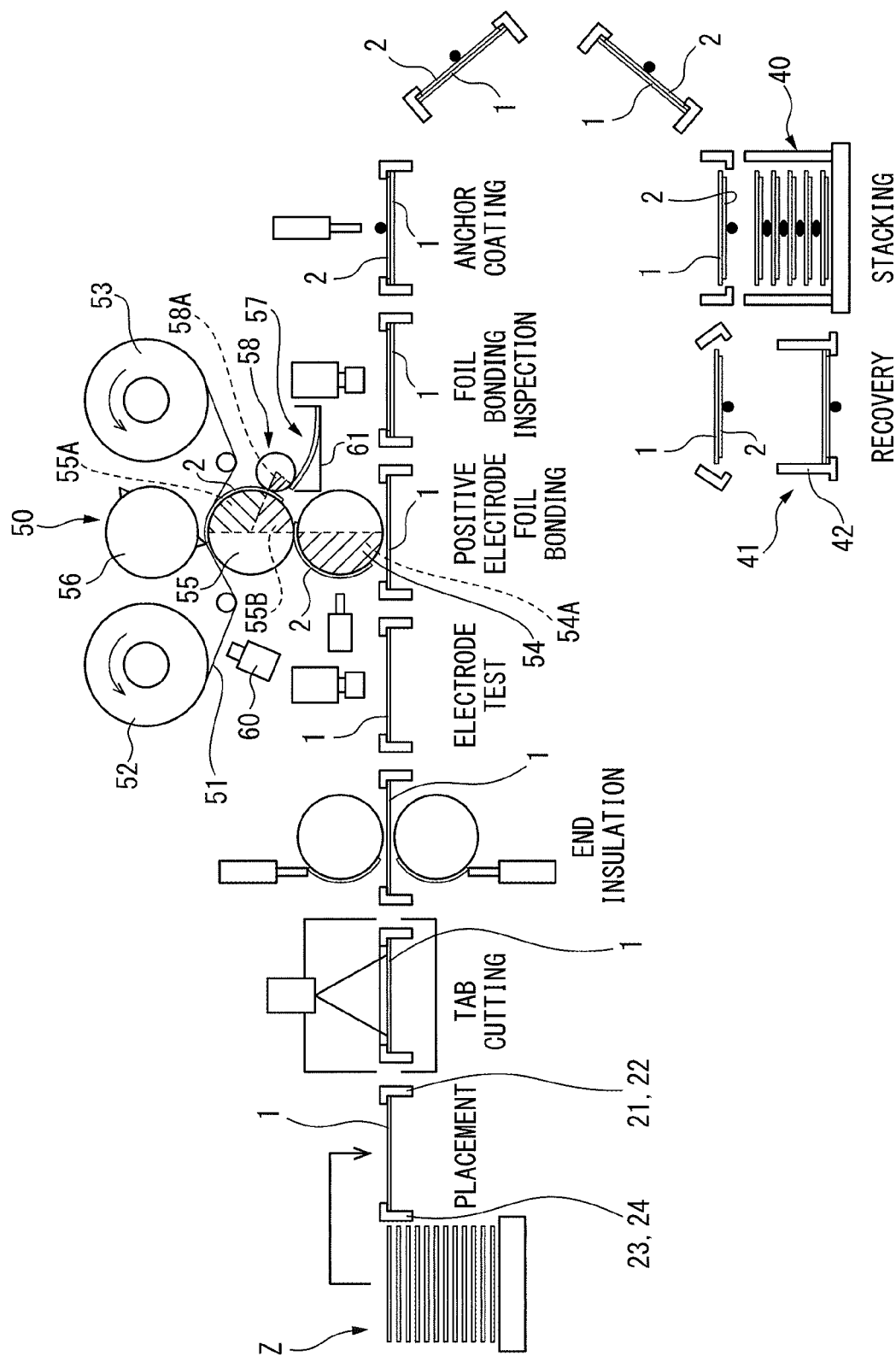
FIG. 7 is a view showing a stacking process of sheet-shaped electrodes.

Next, referring to FIG. 7, the process of stacking the sheet-shaped electrodes will be explained. FIG. 7 schematically shows this process of stacking the sheet-shaped electrodes. This FIG. 7 schematically shows the sheet-shaped electrodes 1 carried on the conveyor plates 20 and clamps 21, 22, 23, 24 attached to the conveyor plates 20. However, in FIG. 7, the conveyor plates 20 are omitted. Note that, this FIG. 7 shows various processing performed when the sheet-shaped electrodes 1 are conveyed by the sheet-shaped electrode conveyance device A.

In the embodiment according to the present invention, the two surfaces of a long narrow copper foil are successively coated at intervals in the longitudinal direction of the copper foil with negative electrode active material layers, solid electrolyte layers, and positive electrode active material layers so as to be superposed on each other. Next, this copper foil is cut into predetermined lengths to thereby prepare sheet-shaped electrodes 1 without positive electrodes with the cross-sectional shapes shown in FIG. 2D. These sheet-shaped electrodes 1 without positive electrodes are stacked on a storage platform for storage. Z in FIG. 7 shows the sheet-shaped electrodes 1 without positive electrodes stacked on the storage platform. The sheet-shaped electrodes 1 stacked on the storage platform are successively placed, one at a time, by a not shown transfer device onto conveyor plates 20 at the upper horizontal straight rail part 10a of the sheet-shaped electrode conveyance device A as shown by the arrow in FIG. 7 at the placement position shown by the arrow of FIG. 1. The part at which the sheet-shaped electrodes 1 without positive electrodes are placed is called a placement station.

While the sheet-shaped electrode 1 carried on the conveyor plate 20 at the upper horizontal straight rail part 10a is moving along the horizontal straight part 10a of the sheet-shaped electrode conveyance device A, first, a tab cutting processing in which the end parts of the copper foil 6 are cut to form a connection use electrode tab is performed. The part where this tab cutting processing is performed will be called a tab cutting processing station. Next, to prevent a short-circuit with the aluminum (positive electrode) foil, an end insulation processing is performed for coating part of the copper foil 6 with an insulating material. The part where this end insulation processing is performed will be called an end insulation processing station. Next, the sheet-shaped electrode 1 without the positive electrode is inspected. The part where this electrode inspection is performed will be called an electrode test station. At this electrode test station, for example, whether or not the connection use electrode tab is accurately formed and whether or not the insulating material is accurately coated is detected. Note that, in this case, whether or not the connection use electrode tab is accurately formed can also be detected at the tab cutting processing station and, further, whether or not the insulating material is accurately coated can also be detected at the end insulation processing station.

Next, a positive electrode foil bonding processing in which an aluminum (positive electrode) foil 2 is bonded on the sheet-shaped electrode 1 by using an adhesive is performed. The part where this positive electrode foil bonding processing is performed is called a positive electrode foil bonding processing station. This positive electrode foil bonding processing is performed by a metal foil bonding device 50. Therefore, next, the metal foil bonding device 50 will be explained. This metal foil bonding device 50 is provided with a feed roller 52 of the metal foil 51 comprised of aluminum (positive electrode) foil, a takeup roller 53 of metal foil 51 comprised of aluminum (positive electrode) foil, and a bonding roller 54, intermediate roller 55, and cutoff roller 56 which are arranged between these feed roller 52 and takeup roller 53 and aligned in the vertical direction. Furthermore, the metal foil bonding device 50 is provided with a recovery device 57 provided with a recovery roller 58.

If the metal foil bonding device 50 is operated, the bonding roller 54 is made to rotate counterclockwise synchronized with the speed of movement of the conveyor plate 20 so that the outer circumferential surface of the bonding roller 54 does not slide but rolls on the top surface of the sheet-shaped electrode 1 on the conveyor plate 20, while the intermediate roller 55 is made to rotate clockwise synchronized with the speed of rotation of the bonding roller 54 so that the outer circumferential surface of the intermediate roller 55 does not slide but rolls on the outer circumferential surface of the bonding roller 54. Further, the cutoff roller 56 is made to rotate counterclockwise synchronized with the speed of rotation of the intermediate roller 55. On the other hand, the recovery roller 58 of the recovery device 57 is made to rotate counterclockwise at a higher speed than the intermediate roller 55 so that the outer circumferential surface of the recovery roller 58 does not slide but rolls on the outer circumferential surface of the intermediate roller 55.

At the inside of the bonding roller 54, a negative pressure control chamber 54A is formed in the hatched region. At the inside of the intermediate roller 55, a negative pressure control chamber 55A and negative pressure control chamber 55B are formed in the hatched region, while at the inside of the recovery roller 58, a negative pressure control chamber 58A is formed at the hatched region. These negative pressure control chambers 54A, 55A, 55B, and 58A are formed so as to be positioned in the hatched regions regardless of the rotating operations of the bonding roller 54, the intermediate roller 55, and the recovery roller 58. The operation of the metal foil bonding device 50 and the negative pressures of the negative pressure control chambers 54A, 55A, 55B, and 58A are controlled by the operation control device C. Note that, at the time of operation of the metal foil bonding device 50, normally, the negative pressure is guided to the insides of the negative pressure control chambers 54A, 55A, and 55B, while negative pressure is not guided to the negative pressure control chamber 58A.

Figure 8:
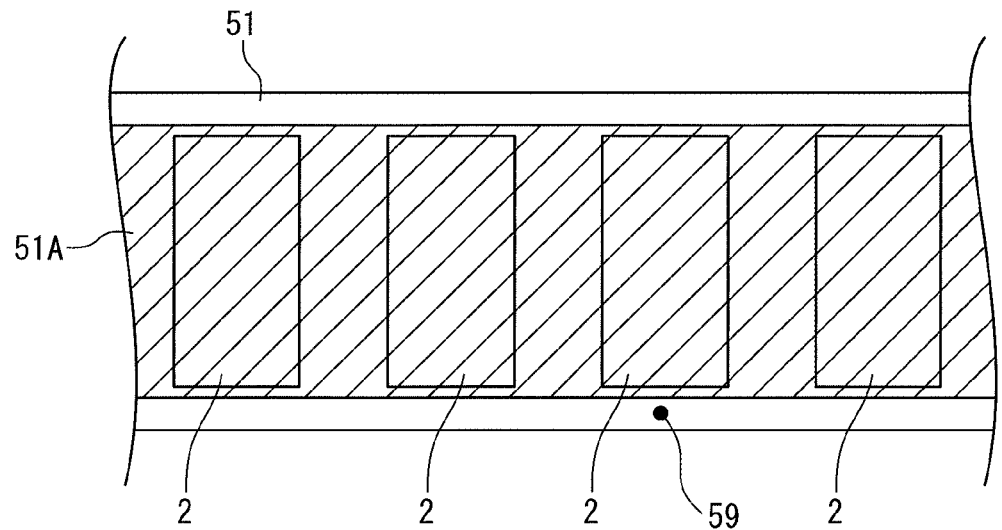
FIG. 8 is a view showing a metal foil.

As shown in FIG. 7, the metal foil 51 is run from the feed roller 52 between the intermediate roller 55 and the cutoff roller 56 and wound around the takeup roller 53. At this time, a rectangular piece of metal foil 2, that is, a piece of aluminum (positive electrode) foil 2 is cut off from the metal foil 51. FIG. 8 shows the piece of metal foil 2 cut off from the metal foil 51. Note that, as shown in FIG. 8 by the hatching, on the surface of the metal foil 51 other than the two end parts, a conductive thin film layer 51A comprised of carbon is formed. The piece of metal foil 2 cut out from the metal foil 51 is normally sucked against the outer circumferential surface of the intermediate roller 55 by the negative pressure in the negative pressure control chambers 55A, 55B acting on the innumerable suction holes formed on the outer circumferential surface of the intermediate roller 55, next, is sucked against the outer circumferential surface of the bonding roller 54 by the negative pressure in the negative pressure control chamber 54A acting on the innumerable suction holes formed on the outer circumferential surface of the bonding roller 54. Next, the piece of metal foil 2, that is, the piece of aluminum (positive electrode) foil 2, sucked against the outer circumferential surface of the bonding roller 54 is bonded on the sheet-shaped electrode 1 carried on the conveyor plate 20.

In this regard, if there is an abnormality in the conductive thin film layer 51A on the metal foil 51, a mark such as shown by 59 in FIG. 8 is displayed in advance on the end part of the metal foil 51 at the manufacturing stage of the metal foil 51. The metal foil 51 with such a mark 59 is wound around the feed roller 52. On the other hand, the metal foil bonding device 50 is provided with a detection sensor 60 able to detect this mark 59. When the mark 59 is detected by this detection sensor 60, it is judged that the piece of metal foil 2 adjoining the mark 59 is abnormal. At the metal foil bonding device 50, the piece of metal foil 2 judged to be abnormal is sucked against the outer circumferential surface of the intermediate roller 55 by the negative pressure in the negative pressure control chamber 55A acting on the innumerable suction holes formed on the outer circumferential surface of the intermediate roller 55. At this time, the negative pressure control chamber 55B of the intermediate roller 55 is opened to the atmosphere and negative pressure is guided to the negative pressure control chamber 58A of the recovery roller 58 of the recovery device 57.

As a result, if the piece of metal foil 2 judged to be abnormal reaches the surroundings of the negative pressure control chamber 55B, it separates from the outer circumferential surface of the intermediate roller 55 and is sucked against the outer circumferential surface of the recovery roller 58 due to the negative pressure inside the negative pressure control chamber 58A acting on the innumerable suction holes formed on the outer circumferential surface of the recovery roller 58. Next, this piece of metal foil 2 judged to be abnormal is recovered at the recovery container 61 of the recovery device 57. Therefore, at this time, a piece of metal foil 2 is not supplied to the outer circumferential surface of the intermediate roller 55. Therefore, at this time, a piece of metal foil 2 is not supplied to the sheet-shaped electrode 1 carried on the conveyor plate 20.

On the other hand, when a normal piece of metal foil 2 is bonded to the sheet-shaped electrode 1 carried on the conveyor plate 20 at the metal foil bonding device 50, the sheet-shaped electrode 1 becomes a sheet-shaped electrode with a positive electrode of the cross-sectional shape shown in FIG. 2C. Next, a foil bonding inspection is performed for inspecting if the piece of metal foil 2, that is, the aluminum (positive electrode) foil 2, is suitably bonded to the sheet-shaped electrode 1. The part where this foil bonding inspection is performed will be referred to as the foil bonding inspection station. Next, an anchor coating processing is performed for coating the aluminum (positive electrode) foil 2 with an adhesive so that the stacked sheet-shaped electrodes 1 do not slip when sheet-shaped electrodes 1 with the positive electrodes are stacked. The part where this anchor coating processing is performed will be referred to as the anchor coating processing station.

Next, if the conveyor plate 20 reaches the semicircular rail part 10b of the sheet-shaped electrode conveyance device A and starts to advance along the semicircular rail part 10b, as shown in FIG. 7, the conveyor plate 20 starts to be inverted.

When the conveyor plate 20 reaches the bottom end of the semicircular rail part 10b of the sheet-shaped electrode conveyance device A, the conveyor plate 20 completely inverts. Next, when reaching a stacking station 40 of the sheet-shaped electrodes 1, if the normal sheet-shaped electrode 1 with the positive electrode is carried on the conveyor plate 20, the stacking action of the sheet-shaped electrodes 1 is performed. If the stacking action is performed, the sheet-shaped electrode 1 with the positive electrode is taken off from the conveyor plate 20. As opposed to this, if the abnormal sheet-shaped electrode 1 is carried on the conveyor plate 20, it passes through the stacking station 40 and is conveyed to a recovery station 41 where the abnormal sheet-shaped electrode 1 is recovered at a recovery container 42 of the recovery station 41. The conveyor plates 20 now in the empty state are successively made to move to the placement position shown in FIG. 1.

Figure 9:
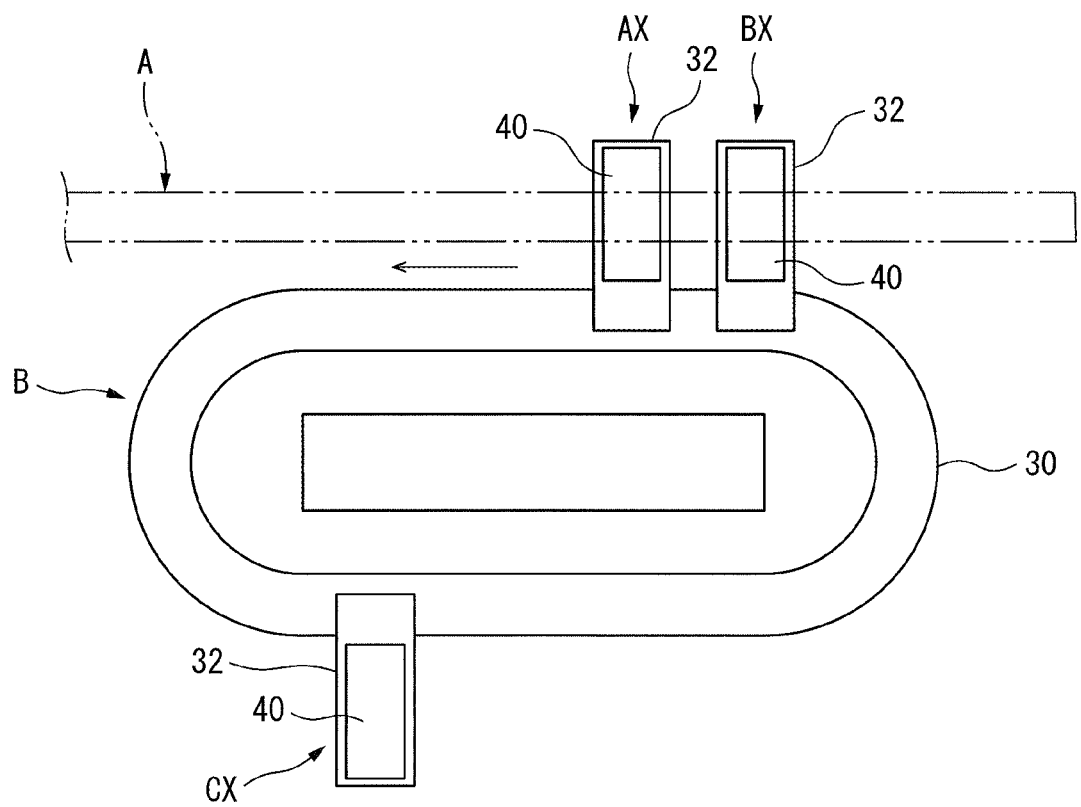
FIG. 9 is a plan view schematically showing a jig conveyance device.

Next, the action of stacking sheet-shaped electrodes 1 with the positive electrodes performed at the stacking station 40 will be simply explained. FIG. 9 is a plan view schematically illustrating the jig conveyance device B shown in FIG. 1. This FIG. 9 shows the sheet-shaped electrode conveyance device A by broken lines. Referring to FIG. 1 and FIG. 9, the jig conveyance device B is a smaller version of the sheet-shaped electrode conveyance device A and has a function similar to the sheet-shaped electrode conveyance device A. That is, the jig conveyance device B is provided with an elliptical shaped rail 30 comprised of a pair of straight parts arranged in parallel and a pair of semicircular parts and movers 31 of linear motors moving on this rail 30. The movers 31 have structures similar to the movers 12 shown in FIG. 4. The end parts of conveyor platforms 32 extending from the elliptical shaped rail 30 to the outside in the horizontal direction are fixed to the movers 31. These conveyor platforms 32 carry stacking jigs 40.

Now then, as explained while referring to FIG. 7, in the embodiment according to the present invention, the conveyor plates 20 are inverted. In that state, the action of stacking sheet-shaped electrodes 1 with the positive electrodes is performed. At this time, as shown in FIG. 7, the top surfaces of the stacking jigs 40 are made to face the sheet-shaped electrodes 1 carried on the conveyor plates 20. In that state, the clamps 21, 22, 23, and 24 of the conveyor plates 20 are disengaged. Due to this, the sheet-shaped electrodes 1 carried on the conveyor plates 20 are made to drop inside the stacking jigs 40 whereby the sheet-shaped electrodes 1 are stacked at the stacking jigs 40. In this case, in the embodiment according to the present invention, a stacking action is performed while making the conveyor plates 20 move in the direction of advance, so while the stacking action is performed, the stacking jigs 40 are conveyed so that the top surfaces of the stacking jigs 40 continue to face the sheet-shaped electrodes 1 carried on the conveyor plates 20.

In this regard, as already explained while referring to FIG. 1 and FIG. 9, the end parts of the conveyor platforms 32 are fixed to the movers 31 of the jig conveyance device B. The stacking jigs 40 are carried on the conveyor platforms 32. Therefore, in the embodiment according to the present invention, the jig conveyance device B is arranged so as to enable the top surfaces of the stacking jigs 40 to continuously face the sheet-shaped electrodes 1 carried on the conveyor plates 20 while the stacking action is being performed, that is, so as to enable the stacking jigs 40 carried on the conveyor platforms 32 to continuously move right under the sheet-shaped electrode conveyance device A while the stacking action is being performed. Furthermore, in the embodiment according to the present invention, the conveyor plates 20 and the conveyor platforms 32 are made to synchronously move so that while the stacking action is being performed, the top surfaces of the stacking jigs 40 continue to face the sheet-shaped electrodes 1 carried on the conveyor plates 20.

In the example shown in FIG. 9, the jig conveyance device B has three conveyor platforms 32 supported by movers 31, and the conveyor platforms 32 carry the stacking jigs 40. These conveyor platforms 32 are made to move by the movers 31 in the arrow direction. In FIG. 9, for example, when the work of stacking the sheet-shaped electrode 1 carried on a certain conveyor plate 20 onto the stacking jig 40 is performed on the stacking jig 40 on the conveyor platform 32 shown by AX, the work of stacking the sheet-shaped electrode 1 from the conveyor plate 20 following this certain conveyor plate 20 onto the stacking jig 40 is performed on the stacking jig 40 on the conveyor platform 32 shown by BX. On the other hand, the stacking jig 40 on the conveyor platform 32 shown by CX shows the stacking jig 40 at which the work of stacking the sheet-shaped electrode 1 on the stacking jig 40 has already been completed. When the work of stacking the sheet-shaped electrode 1 on the stacking jig 40 has been completed, the conveyor platform 32 is made to move at a high speed to behind the preceding conveyor platform 32, that is, in FIG. 9, the conveyor platform 32 shown by BX.

In this way, the sheet-shaped electrodes 1 successively conveyed by the conveyor plates 20 are successively stacked one by one in the successively conveyed stacking jigs 40 on the conveyor platforms 32. The work of stacking the sheet-shaped electrodes 1 at the stacking jigs 40 is performed at a high speed. Therefore, stacks of preset numbers of sheet-shaped electrodes 1 are formed in the stacking jigs 40 in a short time. If a stack of a preset number of the sheet-shaped electrodes 1 is formed, the stacking jig 40 is taken off from the conveyor platform 32 of the jig conveyance device B while holding the stack of the sheet-shaped electrodes 1 for the next processing and an empty stacking jig 40 is placed on the conveyor platform 32.

The stacking jig 40 taken off from the conveyor platform 32 of the jig conveyance device B is transported to a press device where work of pressing the stack of the sheet-shaped electrodes 1 is performed. Next, in the state where the stack of sheet-shaped electrodes 1 is pressed, the side surface parts of the stack of sheet-shaped electrodes 1 are coated with a resin. Due to this, the side surface parts of the sheet-shaped electrodes 1 are fastened together by resin. Next, a positive electrode foil bonding processing is performed to bond aluminum (positive electrode) foil 2 on the sheet-shaped electrodes 1 using an adhesive. Next, a terminal connection processing is performed for connecting electric power take-out terminals to connection-use electrode tabs of the sheet-shaped electrodes 1. Due to this, an electrode stack of sheet-shaped electrodes 1 is produced. The thus formed electrode stack is, for example, covered by a laminate film in a bag manner. By electrically connecting a plurality of electrode stacks covered by laminate film in a bag manner in series or in parallel, for example, a battery to be mounted in a vehicle is formed.

Figure 10:
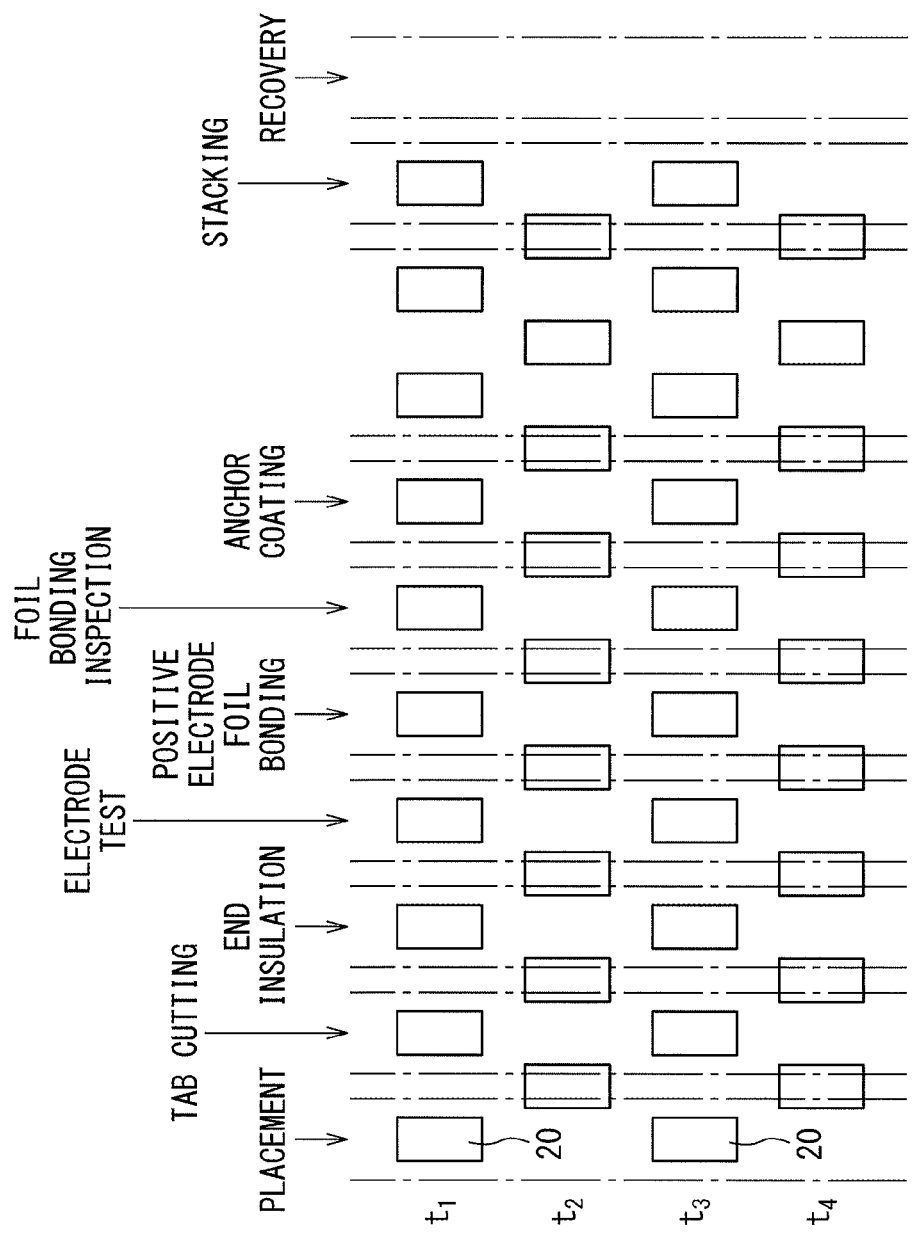
FIG. 10 is a view for explaining the moving state of a conveyor plate.
Figure 11:
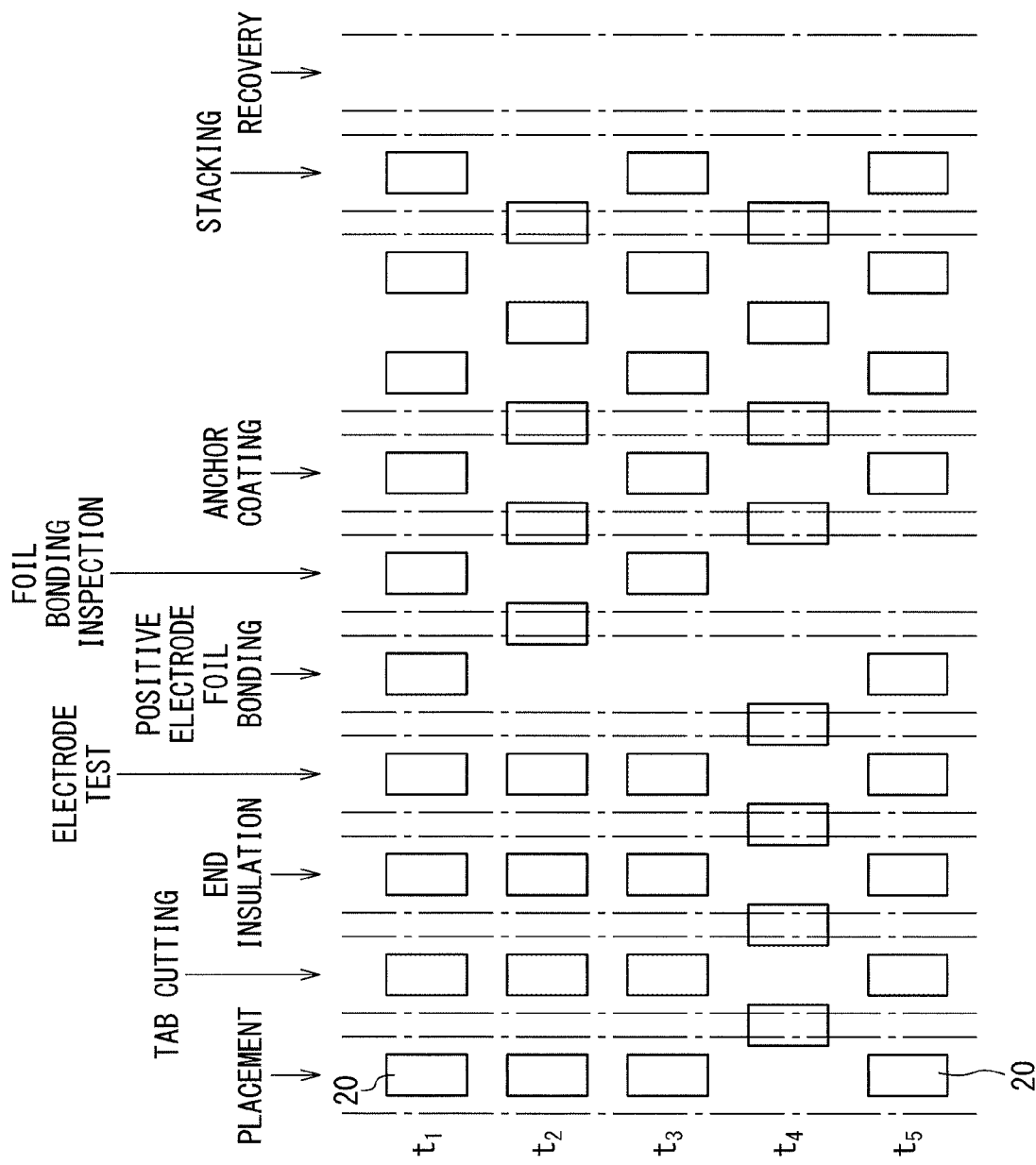
FIG. 11 is a view for explaining the moving state of a conveyor plate.
Figure 12:
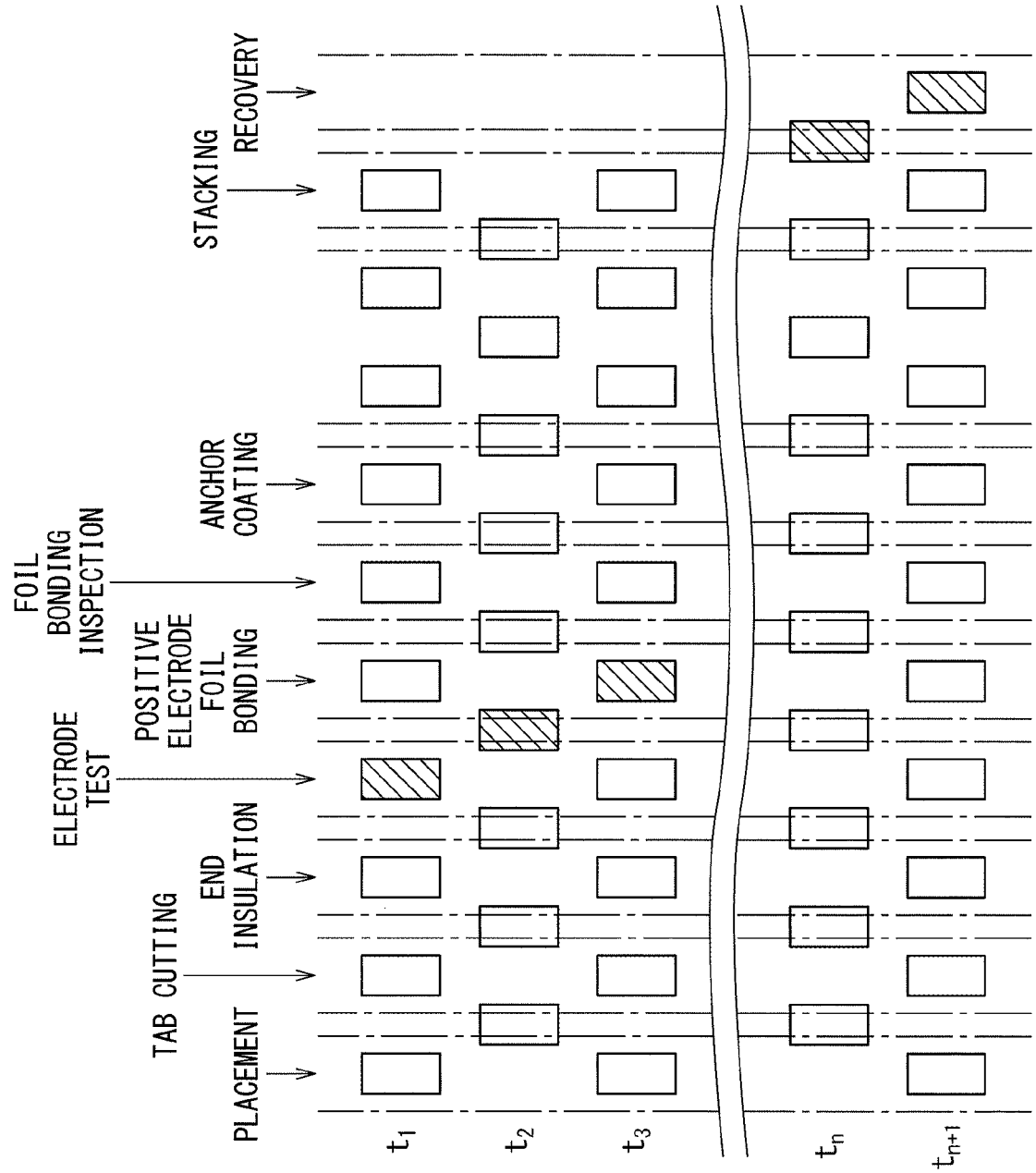
FIG. 12 is a view for explaining the moving state of a conveyor plate.

Next, control for movement of the conveyor plates 20 at the sheet-shaped electrode conveyance device A will be explained. FIG. 10 to FIG. 12 are views schematically showing the placement station, tab cutting processing station, end insulation processing station, electrode test station, positive electrode foil bonding processing station, foil bonding inspection station, anchor coating processing station, stacking station, and recovery station shown in FIG. 7 arranged in a line for explaining the state of movement of the conveyor plates 20 carrying the sheet-shaped electrodes 1. Further, these FIG. 10 to FIG. 12 show the case where as one example the placement station, tab cutting processing station, end insulation processing station, electrode test station, positive electrode foil bonding processing station, foil bonding inspection station, and anchor coating processing station are arranged at equal intervals. Note that, in FIG. 10 to FIG. 12, the positions of the conveyor plates 20 at the times $t_1$, $t_2$, $t_3$ . . . of each equal time interval are shown.

FIG. 10 shows the case where the action of placing the sheet-shaped electrodes 1 is performed at the placement station at the times $t_1$ and $t_3$, no abnormality occurs at any of the stations, and the action of stacking sheet-shaped electrodes 1 is steadily performed at the stacking station. In this case, it is learned that the sheet-shaped electrodes 1 placed on the conveyor plates 20 at the placement station are successively conveyed to the different stations and a stacking action is finally performed at the stacking station. Further, at this time, movement of the movers 12 is controlled so that the conveyor plates 20 move at equal intervals.

In this regard, if an abnormal piece of metal foil 2 is bonded on the sheet-shaped electrode 1 at the metal foil bonding device 50, the sheet-shaped electrode 1 on which this abnormal piece of metal foil 2 is bonded has to be discarded. Therefore, the sheet-shaped electrode 1 ends up being wasted. Therefore, in the embodiment according to the present invention, when it is detected that there is an abnormality in a piece of metal foil 2 at the metal foil bonding device 50, the conveyor plate 20 is made to stand by right before the positive electrode foil bonding processing station until a normal piece of metal foil 2 can be supplied to the sheet-shaped electrode 1. When a normal piece of metal foil 2 can be supplied to the sheet-shaped electrode 1, the conveyor plate 20 is made to move to the positive electrode foil bonding processing station. FIG. 11 shows the state of movement of the conveyor plate 20 in this case.

FIG. 11 shows the case where, at the time $t_1$, it is detected that there is an abnormality in a piece of metal foil 2 to be bonded to the sheet-shaped electrode 1 on the conveyor plate 20 next conveyed to the metal foil bonding device 50. In this case, as will be understood from the time $t_2$ of FIG. 11, the conveyor plate 20 next conveyed to the metal foil bonding device 50 is made to temporarily stop right before the metal foil bonding device 50. At this time, in the example shown in FIG. 11, the above-mentioned conveyor plate 20 next conveyed to the metal foil bonding device 50 is made to temporarily stop at the electrode inspection station right before the positive electrode foil bonding processing station. Furthermore, at this time, the conveyor plates 20 following the above-mentioned conveyor plate 20 next conveyed to the metal foil bonding device 50, that is, the conveyor plates 20 at the placement station, tab cutting processing station, and end insulation processing station, are temporarily stopped inside those stations and the placement processing, tab cutting processing, and end insulation processing are stopped at those stations. On the other hand, at this time, all of the conveyor plates 20 present in front of the above-mentioned conveyor plate 20 to be next conveyed to the metal foil bonding device 50 in the direction of advance continue advancing without temporarily stopping by a speed of advance similar to the normal time shown in FIG. 10. At this time, at the foil bonding inspection station and the anchor coating processing station, a foil bonding inspection and anchor coating processing are performed.

On the other hand, FIG. 11 shows the case where at the time $t_3$ it is detected that there is no abnormality in the piece of metal foil 2 to be bonded to the sheet-shaped electrode 1 on the conveyor plate 20 next conveyed to the metal foil bonding device 50, that is, the case where it is detected that there is no abnormality in the piece of metal foil 2 to be bonded to the sheet-shaped electrode 1 on the conveyor plate 20 temporarily stopped right before the metal foil bonding device 50. In this case, as will be understood from the times $t_3$, $t_4$, and $t_5$ of FIG. 11, the conveyor plate 20 which had been temporarily stopped is made to move to the metal foil bonding device 50. At this time, the conveyor plates 20 following the conveyor plate 20 which had been temporarily stopped also start advancing. All of the conveyor plates 20 present in front of the conveyor plate 20 which had been temporarily stopped in the direction of advance continue to advance at a speed of advance similar to the normal time shown in FIG. 10. It is possible to individually control movement of the conveyor plates 20 in this way since the sheet-shaped electrode conveyance device A uses linear motors and the movement of the movers 12 can be individually controlled by the operation control device C.

In this way, in the embodiment according to the present invention, the stack manufacturing apparatus for manufacturing a stack of sheet-shaped electrodes 1 is provided with the sheet-shaped electrode conveyance device A for conveying sheet-shaped electrodes 1 to the stacking station, which has the rail 10 extending along the conveyance route, a plurality of the movers 12 of linear motors moving over the rail 10, and the conveyor plates 20 attached to the movers 12. The conveyor plates 20 carry sheet-shaped electrodes 1. Furthermore, the stack manufacturing apparatus is provided with the operation control device C for controlling movement of the movers 12 and the metal foil bonding device 50 arranged in the conveyance route for bonding pieces of metal foil 2 on successively conveyed sheet-shaped electrodes 1 on conveyor plates 20. When it is detected that there is an abnormality in a piece of metal foil 2 to be bonded to the sheet-shaped electrode 1 on the conveyor plate 20 next conveyed to the metal foil bonding device 50, the operation control device C controls the movers 12 so that the above conveyor plate 20 next conveyed to the metal foil bonding device 50 is temporarily stopped right before the metal foil bonding device 50. When it is detected that there is no abnormality in the piece of metal foil 2 to be bonded to the sheet-shaped electrode 1 on the conveyor plate 20 temporarily stopped right before the metal foil bonding device 50, the operation control device C controls the movers 12 so that the temporarily stopped conveyor plate 20 is made to move to the metal foil bonding device 50.

On the other hand, in case where it is detected that there is an abnormality in the sheet-shaped electrode 1 before the conveyor plate 20 is conveyed to the metal foil bonding device 50, if the piece of metal foil 2 is bonded to the sheet-shaped electrode 1, this piece of metal foil 2 also has to be discarded together with the sheet-shaped electrode 1. Therefore, the piece of metal foil 2 ends up becoming wasted. Therefore, in the embodiment according to the present invention, if it is detected that there is an abnormality in the sheet-shaped electrode 1 before the conveyor plate 20 is conveyed to the metal foil bonding device 50, the action of bonding the piece of metal foil 2 to the abnormal sheet-shaped electrode 1 in the metal foil bonding device 50 is stopped. In this case, in the embodiment according to the present invention, the action of bonding the piece of metal foil 2 to the abnormal sheet-shaped electrode 1 is stopped by temporarily stopping the operation of the metal foil bonding device 50. In this case, the conveyor plate 20 carrying the abnormal sheet-shaped electrode 1 simply passes through the metal foil bonding station. FIG. 12 shows the state of movement of the conveyor plate 20 in this case.

FIG. 12 shows the case where it is detected that there is an abnormality in the sheet-shaped electrode 1 at the electrode inspection station at the time $t_1$. Note that, in FIG. 12, the conveyor plate 20 carrying the abnormal sheet-shaped electrode 1 is shown by hatching. In this case, as will be understood from FIG. 12, all of the conveyor plates 20 continue to advance without stopping by a speed of advance similar to the normal time shown in FIG. 10. However, when the conveyor plate 20 carrying the abnormal sheet-shaped electrode 1 moves inside the metal foil bonding device 50, the operation of the metal foil bonding device 50 is stopped. Specifically speaking, the operation of the metal foil bonding device 50 is stopped from when the conveyor plate 20 carrying the abnormal sheet-shaped electrode 1 reaches an intermediate point between the electrode inspection station and the positive electrode foil bonding processing station to when reaching an intermediate point between the positive electrode foil bonding processing station and the foil bonding inspection station. Therefore, at this time, the action of bonding the piece of metal foil 2 to the abnormal sheet-shaped electrode 1 is stopped. Furthermore, at this time, the foil bonding inspection and anchor coating processing for the conveyor plate 20 carrying the abnormal sheet-shaped electrode 1 at the foil bonding inspection station and the anchor coating processing station are stopped.

On the other hand, at this time, the stacking work is not performed even if the conveyor plate 20 carrying the abnormal sheet-shaped electrode 1 reaches the placement station. The conveyor plate 20 passes through the placement station while carrying the abnormal sheet-shaped electrode 1 and, as will be understood from the time $t_{n+1}$ of FIG. 12, advances to the recovery station. At the recovery station, the abnormal sheet-shaped electrode 1 is recovered.

On the other hand, if it is detected that there is an abnormality in the sheet-shaped electrode 1 after the conveyor plate 20 passes the metal foil bonding device 50, for example, if it is detected that there is an abnormality in the sheet-shaped electrode 1 at the foil bonding inspection station, all of conveyor plates 20 continue to advance without stopping by a speed of advance similar to the normal time shown in FIG. 10. In this case, the placement processing, tab cutting processing, end insulation processing, electrode test, and positive electrode foil bonding at the placement station, tab cutting processing station, end insulation processing station, electrode test station, and positive electrode foil bonding processing station are successively performed and the anchor coating processing at the anchor coating processing station is stopped. At this time, the stacking work is not performed even if the conveyor plate 20 carrying the abnormal sheet-shaped electrode 1 reaches the placement station. The conveyor plate 20 passes through the stacking station while carrying the abnormal sheet-shaped electrode 1 and advances to the recovery station. At the recovery station, the abnormal sheet-shaped electrode 1 is recovered.

Figure 13:
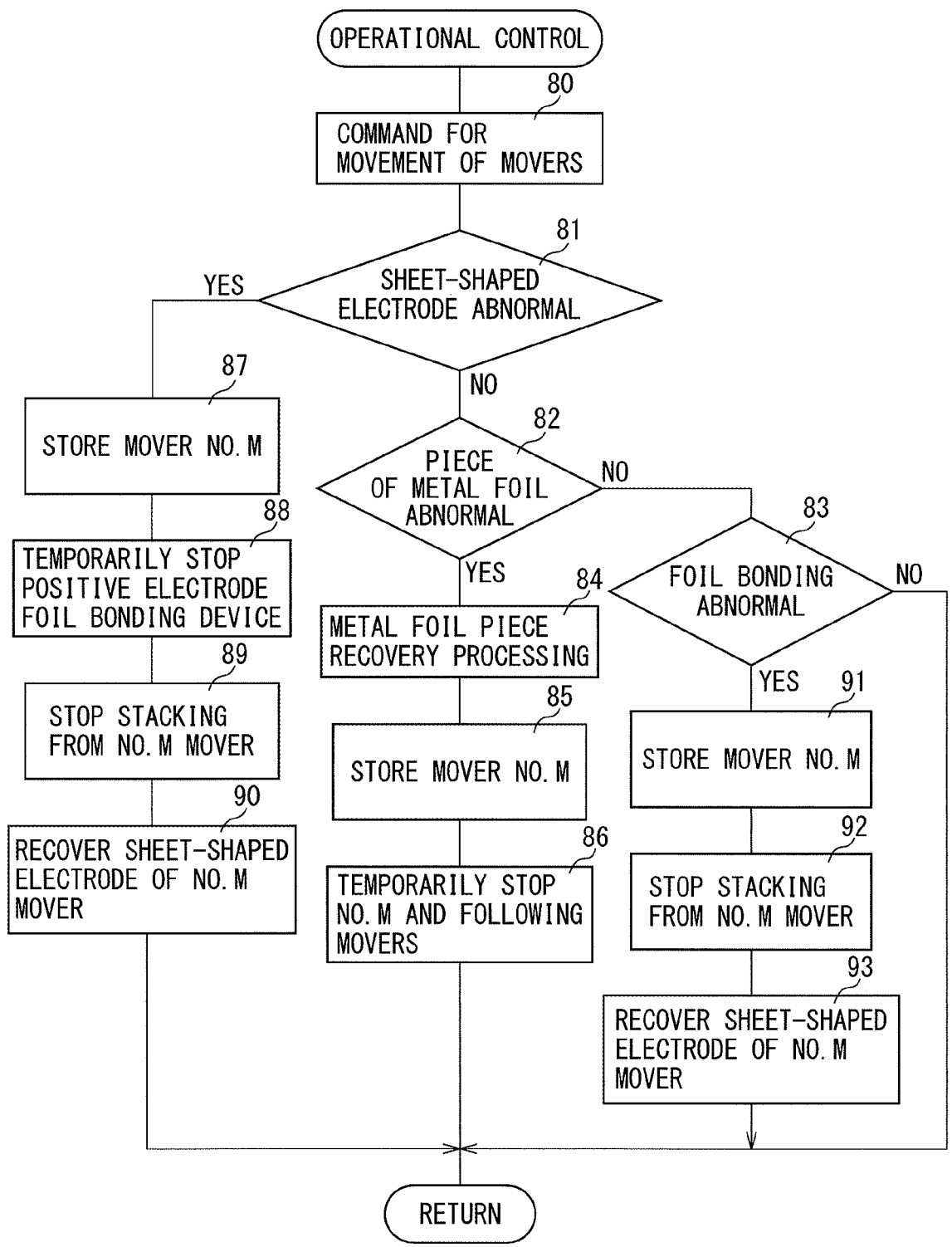
FIG. 13 is a flow chart for control of the operation of the sheet-shaped electrode conveyance device.

The operation control device C houses a computer. FIG. 13 shows the operation control routine of the sheet-shaped electrode conveyance device A performed at this operation control device C. This operation control routine is repeatedly performed. Referring to FIG. 13, first, at step 80, a movement command is issued for each mover 12. This movement command is, for example, a command to each mover 12 to move spaced apart by a predetermined certain distance from the mover 12 moving one position earlier until passing through the stacking station. Due to this movement command, each mover 12 moves spaced apart by the predetermined certain distance from the mover 12 moving one position earlier unless a stop command is issued.

Next, at step 81, it is judged at the electrode inspection station whether the sheet-shaped electrode 1 is abnormal. When it is judged that the sheet-shaped electrode 1 is normal, the routine proceeds to step 82 where it is judged based on the result of detection of the detection sensor 60 if there is an abnormality in the piece of metal foil 2 to be bonded to the sheet-shaped electrode 1 on the conveyor plate 20 next conveyed to the metal foil bonding device 50. When it is judged that there is no abnormality in the piece of metal foil 2 to be bonded to the sheet-shaped electrode 1 on the conveyor plate 20 next conveyed to the metal foil bonding device 50, the routine proceeds to step 83 where it is judged at the foil bonding inspection station whether the piece of metal foil 2 is suitably bonded to the sheet-shaped electrode 1, that is, whether there is an abnormality in the sheet-shaped electrode 1 bonded to the piece of metal foil 2. When it is judged at the foil bonding inspection station that there is no abnormality at the sheet-shaped electrode 1, the routine again returns to step 80. In this case, each mover 12 continues moving spaced apart by the predetermined certain distance from the mover 12 moving one position earlier until passing through the stacking station. At the stacking station, the action of stacking sheet-shaped electrodes 1 onto the stacking jigs 40 is performed.

On the other hand, if at step 82 it is judged that there is an abnormality in the piece of metal foil 2 to be bonded to the sheet-shaped electrode 1 on the conveyor plate 20 next conveyed to the metal foil bonding device 50, the routine proceeds to step 84 where the piece of metal foil 2 considered abnormal is recovered in the recovery container 61 of the recovery device 57 by controlling the negative pressure inside the negative pressure control chambers 54A, 55A, 55B, and 58A. At this time, the piece of metal foil 2 is not supplied to the outer circumferential surface of the bonding roller 54. Next, at step 85, the number of the mover 12 (No. M of the mover 12) of the conveyor plate 20 next conveyed to the metal foil bonding device 50 is stored. Note that, as explained above, each mover 12 is numbered.

Next, at step 86, the No. M mover 12, that is, the mover 12 of the conveyor plate 20 next conveyed to the metal foil bonding device 50, and the movers 12 following the No. M mover 12 are temporarily stopped. At this time, the movers 12 in the front of the No. M mover 12 in the direction of advance continue moving spaced apart by the predetermined certain distance from the movers 12 moving one position earlier until passing through the stacking station. At the stacking station, the action of stacking the sheet-shaped electrodes 1 onto the stacking jigs 40 is performed. Next, if at step 82 it is judged that there is no abnormality in the piece of metal foil 2 to be bonded to the sheet-shaped electrode 1 on the conveyor plate 20 next conveyed to the metal foil bonding device 50, the routine returns to step 80 through step 83.

At this time, as will be understood from FIG. 11, the No. M mover 12 moves while maintaining a large distance from the mover 12 moving one position earlier before passing the stacking station. At the stacking station, the action of stacking the sheet-shaped electrodes 1 onto the stacking jigs 40 is performed. On the other hand, at this time, the movers 12 following the No. M mover 12 continue to move while maintaining the predetermined certain distance from the movers 12 moving one position earlier before passing the stacking station. At the stacking station, the action of stacking the sheet-shaped electrodes 1 onto the stacking jigs 40 is performed.

On the other hand, if at step 81 it is judged at the electrode inspection station that the sheet-shaped electrode 1 is abnormal, the routine proceeds to step 87 where the No. M of the mover 12 of the conveyor plate 20 carrying the abnormal sheet-shaped electrode 1 is stored. Next, at step 88, the metal foil bonding device 50 is stopped from operating so that a piece of metal foil 2 is not bonded to the abnormal sheet-shaped electrode 1. Next, at step 89, a command is issued prohibiting the action of stacking the sheet-shaped electrode 1 carried on the conveyor plate 20 of the No. M mover 12 onto the stacking jig 4, next, at step 90, a command is issued recovering the sheet-shaped electrode 1 carried on the conveyor plate 20 of the No. M mover 12, that is, the abnormal sheet-shaped electrode 1, at the recovery station. Therefore, at this time, the sheet-shaped electrode 1 carried on the conveyor plate 20 of the No. M mover 12 is recovered at the recovery station.

On the other hand, if at step 83 it is judged that an abnormality is detected at the sheet-shaped electrode 1 at the foil bonding inspection station, the routine proceeds to step 91 where the No. M of the mover 12 of the conveyor plate 20 carrying the abnormal sheet-shaped electrode 1 is stored. Next, at step 92, a command is issued prohibiting the action of stacking the sheet-shaped electrode 1 carried on the conveyor plate 20 of the No. M mover 12 onto the stacking jig 4, next, at step 93, a command is issued recovering the sheet-shaped electrode 1 carried on the conveyor plate 20 of the No. M mover 12, that is, the abnormal sheet-shaped electrode 1 at the recovery station. Therefore, at this time, the sheet-shaped electrode 1 carried on the conveyor plate 20 of the No. M mover 12 is recovered at the recovery station.

The invention claimed is:

1. An apparatus for manufacturing a stack of sheet-shaped electrodes comprising;
    a sheet-shaped electrode conveyance device which has a rail extending along a conveyance route, a plurality of movers of linear motors moving on the rail, and conveyor plates attached to the movers to convey sheet-shaped electrodes to a stacking station, each conveyor plate carrying a sheet-shaped electrode,
    an operation control device for control of movement of the movers and
    a metal foil bonding device arranged in the conveyance route for bonding pieces of metal foil on successively conveyed sheet-shaped electrodes on the conveyor plates, wherein
    said operation control device controls the movers to make the conveyor plate next conveyed to the metal foil bonding device stop temporarily right before the metal foil bonding device when it is detected that there is an abnormality in a piece of metal foil to be bonded to the sheet-shaped electrode on the conveyor plate next conveyed to the metal foil bonding device, and
    said operation control device controls the movers to make the conveyor plate which is temporarily stopped move to the metal foil bonding device when it is detected that there is no abnormality in a piece of metal foil to be bonded to the sheet-shaped electrode on the conveyor plate temporarily stopped right before the metal foil bonding device.

2. The apparatus according to claim 1, wherein when it is detected that there is an abnormality in the sheet-shaped electrode before the conveyor plate is conveyed to the metal foil bonding device, an action of bonding a piece of metal foil to the abnormal sheet-shaped electrode at the metal foil bonding device is stopped.

3. The apparatus according to claim 2, wherein when the action of bonding a piece of metal foil to the abnormal sheet-shaped electrode at the metal foil bonding device is stopped, a stacking action at the stacking station is stopped and the abnormal sheet-shaped electrode is recovered.

4. The apparatus according to claim 1, wherein when it is detected that there is an abnormality in the sheet-shaped electrode after the conveyor plate passes through the metal foil bonding device, a stacking action at the stacking station is stopped and the abnormal sheet-shaped electrode is recovered.

5. The apparatus according to claim 1, wherein the metal foil bonding device is provided with a bonding roller for successively bonding pieces of metal foil to successively conveyed sheet-shaped electrodes.

6. The apparatus according to claim 1, where the metal foil bonding device is provided with a recovery device recovering an abnormal piece of metal foil.

7. The apparatus according to claim 1, wherein the sheet-shaped electrode includes a collector-use metal foil and at least one of a positive electrode active material layer and negative electrode active material layer formed on the collector-use metal foil.

* * * * *